United States Patent [19]
Little et al.

[11] Patent Number: 5,998,858
[45] Date of Patent: *Dec. 7, 1999

[54] MICROCIRCUIT WITH MEMORY THAT IS PROTECTED BY BOTH HARDWARE AND SOFTWARE

[75] Inventors: Wendell L. Little, Denton; Stephen M. Curry, Dallas; Steven N. Grider, Carrollton; Mark L. Thrower, Carrollton; Steven N. Hass, Carrollton; Michael L. Bolan, Dallas; Ricky D. Fieseler, Fort Worth; Bradley M. Harrington, Carrollton, all of Tex.

[73] Assignee: Dallas Semiconductor Corporation, Dallas, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 08/684,644

[22] Filed: Jul. 19, 1996

Related U.S. Application Data

[60] Provisional application No. 60/001,279, Jul. 20, 1995, provisional application No. 60/001,277, Jul. 20, 1995, and provisional application No. 60/001,278, Jul. 20, 1995.

[51] Int. Cl.$^6$ .................................................. H01L 23/02
[52] U.S. Cl. .......................... 257/678; 257/704; 257/708; 257/709; 257/922; 361/740; 361/747
[58] Field of Search ................................ 380/4; 257/678, 257/772, 781, 922, 679, 704, 708, 709, 710, 711; 361/740, 747, 828

[56] References Cited

U.S. PATENT DOCUMENTS

| | | | |
|---|---|---|---|
| 4,249,034 | 2/1981 | Fichot et al. | 257/710 |
| 4,577,056 | 3/1986 | Butt | 257/709 |
| 4,691,350 | 9/1987 | Kleijne et al. | 380/3 |
| 4,927,505 | 5/1990 | Sharma et al. | 204/34.5 |
| 5,027,397 | 6/1991 | Double et al. | 380/4 |
| 5,053,992 | 10/1991 | Gilberg et al. | 365/53 |
| 5,072,331 | 12/1991 | Thiele et al. | 361/380 |
| 5,134,460 | 7/1992 | Brady et al. | 357/71 |
| 5,155,299 | 10/1992 | Mahulikar et al. | 257/709 |
| 5,159,629 | 10/1992 | Double et al. | 380/4 |
| 5,175,609 | 12/1992 | DiGiacomo et al. | 257/781 |
| 5,339,222 | 8/1994 | Simmons et al. | 361/818 |
| 5,461,261 | 10/1995 | Nishiguchi | 257/781 |
| 5,548,485 | 8/1996 | Bethurum et al. | 257/679 |
| 5,574,628 | 11/1996 | Persia et al. | 257/679 |
| 5,631,499 | 5/1997 | Hosomi et al. | 257/781 |
| 5,648,686 | 7/1997 | Hirano et al. | 257/781 |
| 5,889,323 | 8/1997 | Tachibana | 257/704 |

FOREIGN PATENT DOCUMENTS

| | | |
|---|---|---|
| 0 256 357 | 2/1988 | European Pat. Off. . |
| 0 417 447 | 3/1991 | European Pat. Off. . |
| 0 529 503 | 3/1993 | European Pat. Off. . |
| 36 2097355 | 5/1987 | Japan ..................................... 257/704 |
| 000089044 | 9/1983 | United Kingdom .................. 257/704 |
| 2 182 467 | 5/1987 | United Kingdom . |

*Primary Examiner*—Donald L. Monin, Jr.
*Assistant Examiner*—Michael Dietrich
*Attorney, Agent, or Firm*—Jenkins & Gilchrist P.C.

[57] ABSTRACT

A secure electronic data module containing a monolithic semiconductor chip of the type having a memory that is protected by a combination of hardware and software mechanisms such that unauthorized access to the data stored in the memory is prevented. The monolithic semiconductor chip comprises a plurality of solder bumps for attaching the chip to a substrate that may be a printed circuit board or another chip; a multi-level interlaced power and ground lines using minimum geometries; and a detection circuit block for detecting an external trip signal that may be produced by a pre-specified change in an operating condition brought on by unauthorized accessing, or an internal trip signal that may be produced by shorting of power and ground lines or by a change in an oscillator's frequency, also associated with or appurtenant to unauthorized accessing of the secure memory.

27 Claims, 6 Drawing Sheets

MICROCIRCUIT WITH MEMORY THAT IS PROTECTED BY BOTH HARDWARE AND SOFTWARE

This nonprovisional application claims priority based upon the following prior U.S. Provisional Patent Applications: (i) entitled "Method And Apparatus For Encryption Key Creation," Ser. No.: 60/001,277, filed Jul. 20, 1995, in the names of Wendell Little and Stephen Curry; (ii) entitled "Microcircuit With Memory That Is Protected by Both Hardware and Software," Ser. No.: 60/001,279, filed Jul. 20, 1995, in the names of Wendell Little, Rick Fieseler, Steve Hass, and Brad Harrington; (iii) entitled "Single Chip Microprocessor, Math Co-Processor, Random Number Generator, Real-Time Clock, and RAM Having A 1-Wire Interface," Ser. No.: 60/001,278, filed Jul. 20, 1995, in the names of Wendell Little and Andreas Curiger.

CROSS-REFERENCE TO RELATED APPLICATIONS

This application hereby incorporates by reference the following co-assigned patent applications, concurrently filed herewith, which describe related subject matter:

| Ser. No./ Docket No. | Title | Inventor(s) |
| --- | --- | --- |
| 20661-00421 | Method And Apparatus For Encryption Key Creation | Shweitzer, et al. |
| 20661-00423 | Single Chip Microprocessor, Math Co-Processor, Random Number Generator, Real-Time Clock, and RAM Having A 1-Wire Interface | Little, et al. |
| 20661-00432 | Secure Module With Microprocessor And Co-Processor | Little, et al. |

BACKGROUND OF THE INVENTION

1. Technical Field of the Invention

The present invention relates to secure integrated circuits and, in particular, to microcircuits with memory that is protected by both hardware and software.

2. Description of Related Art

In today's emerging area of electronic commerce, security of data that is stored in a semiconductor memory is a burgeoning issue with which authorized owners of such data must contend. In general, authorized access to electronic data is governed by hardware and software verification schemes involving passwords, personal identification numbers and the like. To further reduce the probability of successful unauthorized access to data, component manufacturers have also resorted to such techniques as data encryption. However, there are many applications wherein security concerns remain high enough that additional security mechanisms may be warranted.

A reliable, efficacious and economical solution to enhanced data security is to provide a combination of physical barriers wherein an intruder must grapple with successively overcoming such barriers. Although each physical barrier may itself be rather simple, it can be appreciated that a combination thereof may be a powerful solution wherein an attempt to overcome an outer barrier is designed to thwart successful access to electronic data either by triggering an inner barrier or by destroying the data altogether.

One such physical barrier can be a sealable container within which a semiconductor chip containing memory is disposed. By providing conductive surfaces as part of the container, it is possible in such an arrangement to efficiently integrate both data security and data transmission interfacing. Further, by attaching the semiconductor chip to a substrate disposed within the container using solder bumps, and by encapsulating the chip with a conventional epoxy resin, it can be appreciated that the efficacy of many reverse engineering techniques for determining logic states in the memory cells, for example, backside emission microscopy, is severely curtailed.

Another simple, yet highly effective, physical barrier can be a multi-layered and interlaced conductive grid provided as part of the metallization of the semiconductor chip itself. It can be appreciated that providing an interlaced conductive grid, formed with minimum geometries, can deter effective electron microscopy as well as detect microprobing. Based upon detecting such microprobing of the conductive layers, it would be advantageous to provide a trip circuit that would destroy the data stored in the memory either passively by cutting off the internal power supply, or actively by transmitting an erase signal to the memory array.

Furthermore, it would be advantageous to provide a detection/trip circuit as part of the monolithic semiconductor chip, that is capable of detecting a change in any environmental condition associated with an unlawful attempt to gain access. For example, the detection circuit can detect and be tripped by a predetermined magnitude of change, or by reaching a predetermined set-point in electromagnetic radiation, chemical composition, ambient pressure, temperature and the like. In addition, by monitoring a real-time oscillator associated with the semiconductor chip, a data erase signal can also be generated should the unlawful entry result in either a change in the frequency of the real-time oscillator or a temporary stoppage of the real-time oscillator.

Although some of the above-mentioned security enhancements have heretofore been extant for sometime, no prior art system is known to have all of the advantages and novel features of the cost-effective combination solution described, and claimed, hereinbelow.

SUMMARY OF THE INVENTION

In one aspect of a presently preferred exemplary embodiment, the present invention includes a housing with a cavity, within which is disposed a substrate with a top surface and a bottom surface; a semiconductor chip of the type having a monolithic integrated microcircuit, the semiconductor chip being affixed to the substrate by a plurality of solder bumps. In another aspect of the present invention, the substrate to which the semiconductor chip is affixed can be a printed circuit board or another semiconductor chip having additional circuitry.

In a yet another aspect of the present invention, the semiconductor chip comprises a microprocessor with a one-wire interface having a multi-layered interlaced conductive grid, drawn with minimum geometry; and a detection/trip circuit for detecting a change in an environmental condition or in a frequency of a real-time oscillator. The detected change is associated with unauthorized accessing of the electronic data stored in the memory array of the semiconductor chip.

The exemplary embodiments incorporate multiple security techniques to thwart unwanted technical and nontechnical intrusions into the microcircuit and its associated memory. Such security techniques include, but are not limited to a variety and combination of circuit construction techniques, circuit assembly techniques, physical barriers, and circuit software and hardware processes. More specifically, the circuit:

1. is hermetically sealed within a stainless steel enclosure. The circuit can also be sealed within a polymer enclosure. If a polymer enclosure is used, a conductive contact surface must be provided for touching the microcircuit to a host circuit.

2. contains SRAM memory which is backed by a battery enclosed with the circuitry. Upon tampering with the enclosure around the circuitry, trip circuitry is triggered thereby disconnecting the battery's energy with the SRAM. This results in near instantaneous SRAM data destruction.

3. can contain a triggerable high/low temperature window circuit. When the temperature is above or below a predetermined temperature the circuit will trigger. Upon the triggering of the temperature circuit, the data in memory will be instantaneously erased.

4. can have an interlaced power and ground grid covering the die of the microcircuit. Interlacing the power and ground prohibits probing of the die microcircuitry because power and ground will be shorted by a probe thereby destroying information stored in SRAM. Interlacing power and ground acts as a barrier to electron microscope inspection. Furthermore, interlacing is a physical barrier which inhibits effective metal removal with chemical etch techniques because chemical etching of closely interlaced supply and ground lines will short power and ground destroying live SRAM data.

5. can have multiple metalized layers over the die circuitry. Each metalized layer can be different metal or non-metal compounds. The compounds can be from the group including polyimide (a nonconductive layer), chromium, chromium and copper, copper, or solder. Layering of the various compounds will act as a shield to inhibit electron microscope viewing of the die circuitry, will increase the difficulty of circuit dissection and will dissolve at different rates when chemically etched thereby making a controlled etching process extremely difficult.

6. can be encapsulated as a circuit die and printed circuit board. Encapsulation can be with a solid or hollow plastic or polymer barrier. Such a barrier increases the difficulty of penetrating to the microcircuit without destroying data stored in the SRAM memory.

7. can have various wrongful entry detection circuits that destroy live SRAM data upon tampering with the sealed enclosure. Such detection circuits can include, but are not limited to light sensing circuitry, pressure sensitive circuitry, temperature sensitive circuitry, break in internal power sensitive circuitry, gas detection circuitry, electromagnetic wave sensitive circuitry, timed self destruct circuitry and moisture detection circuitry. This detection circuitry may be totally made of hardware so that upon a prescribed detection SRAM memory is destroyed. The detection circuitry can also be partially software controlled so that a plurality of software selectable detection events must occur prior to destruction of data within SRAM. The exemplary embodiment has a circuit which detects a change in physical environment and destroys the data in SRAM memory based on what is detected.

8. can incorporate solder bump technology. Solder bump technology allows the die circuitry to be mounted on a circuit card wafer side up instead of circuit side up with leads from the top of the die circuitry down to the circuit card. Inspection of the circuitry and memory data on the die is made extremely difficult because the ease of destroying the circuitry and/or the data within memory.

9. can incorporate flip-chip technology. Flip-chip technology is used with solder bump technology wherein the die circuitry is mounted with the chip flipped such that the die circuitry faces the circuit board it is mounted to and the die wafer faces away from the circuit board.

10. can incorporate hardware, software and/or firmware for timed access authorization which makes sure that circuit operations occur within a predetermined amount of time.

11. can incorporate a timing oscillator that must run within a predetermined frequency range or else data within memory will be destroyed. This is useful because the oscillator may speed up or slow down when the circuit is subjected to hot or cold conditions or when the circuitry is being probed or reverse engineered.

Combinations and Permutations of a plurality of the above mentioned security techniques provide exemplary microcircuits that can be combined with a memory circuit and a one-wire circuit so that the memory and the actual circuitry is protected from unwarranted intrusions.

BRIEF DESCRIPTION OF THE DRAWINGS

A more complete understanding of the present invention may be had by reference to the following Detailed Description when taken in conjunction with the accompanying Drawings wherein.

DETAILED DESCRIPTION OF THE DRAWINGS

Figure 1:
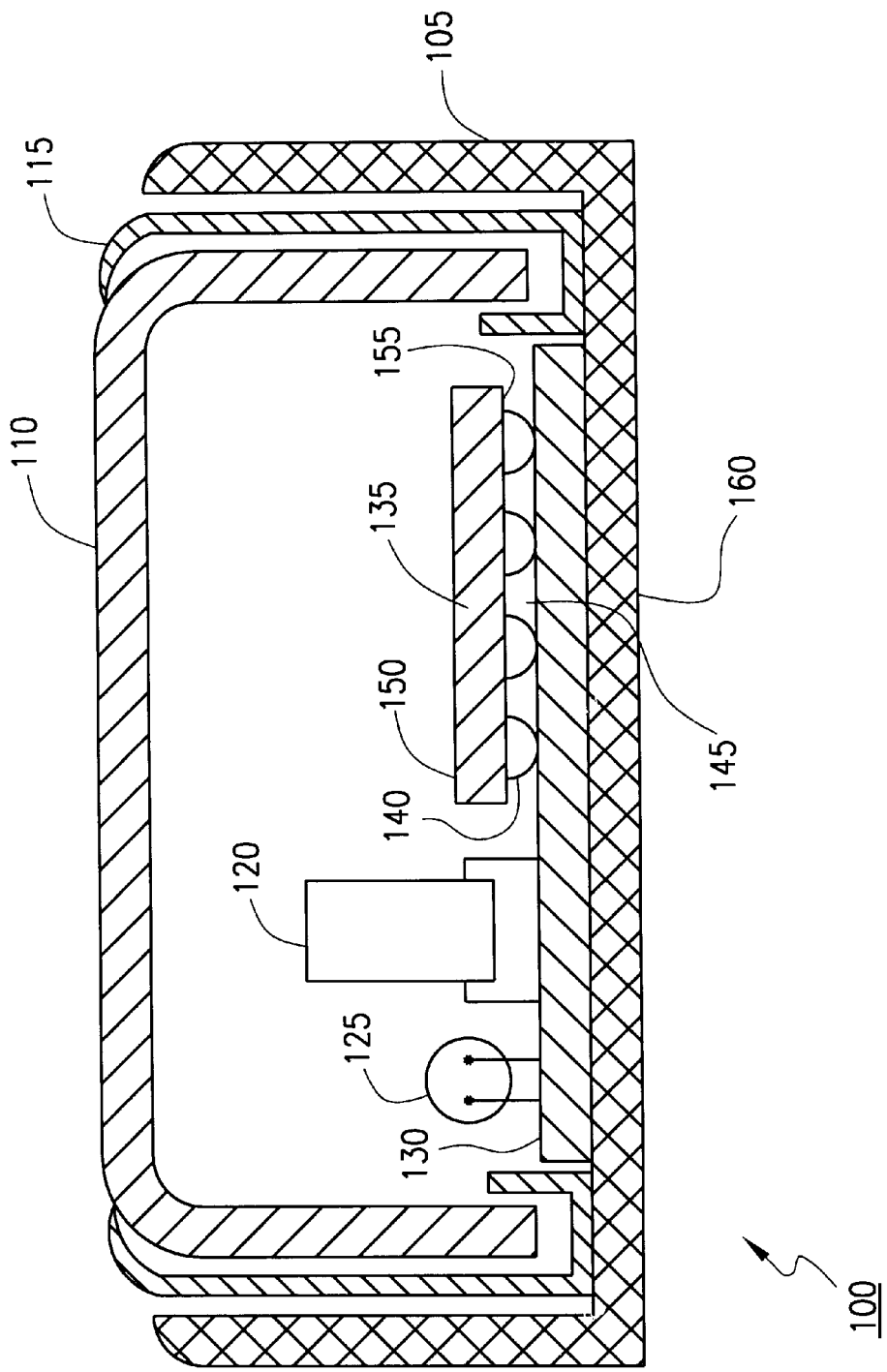
FIG. 1 is a cross-sectional view of an exemplary embodiment of an electronic data module that may be used for encasing a microcircuit chip with memory that is protected by both hardware and software in accordance with the teachings of the present invention.

Referring now to the Drawings wherein like or similar elements are designated with identical reference numerals throughout the several views, and wherein the various elements depicted are not necessarily drawn to scale, and more particularly to FIG. 1, there is shown a cross-sectional view of a presently preferred exemplary embodiment of an electronic data module 100 that may be used for encasing a microcircuit chip with memory that is protected by both hardware and software mechanisms according to the teachings of the present invention. The electronic data module 100, which may be substantially token-shaped or button-shaped, is designed to hermetically house a monolithic semiconductor chip 135 that may comprise a host of circuit elements such as memory, microprocessors, multiplexing circuitry and electrostatic discharge protection circuitry. A housing 160 of the electronic data module 100 preferably comprises a male conductive surface 110 and a female conductive surface 105 that are designed so that the male conductive surface 110 is inserted into the female conductive surface 105 which is lined with an insulator 115. In a presently preferred exemplary embodiment, both the female conductive surface 105 and the male conductive surface 110 comprise stainless steel surfaces.

According to the teachings of the present invention, the monolithic semiconductor chip 135 is affixed to a substrate 130 by means of a plurality of solder bumps, for example, solder bump 140, such that a top passivated side 155 of the monolithic semiconductor chip 135 is positioned facing the substrate 130. According to the present invention, a back side or bulk side 150 of the monolithic semiconductor chip 135 is preferably encapsulated with a conventional epoxy resin. Further, the gap 145 between the monolithic semiconductor chip 135 and the substrate 130 is also preferably filled with a conventional resinous filling medium by capillary phenomenon.

Also affixed to the substrate 130 of the presently preferred exemplary electronic data module 100 are a crystal 125 to at least provide a time base, and a battery 120. It can be readily appreciated that the substrate 130 of the present invention may be a conventional printed circuit board or the like. Also, in an additional aspect of the present invention, the substrate 130 may be another semiconductor chip disposed on a printed circuit board that is affixed to the cavity created by the housing 160. In a yet another aspect, the substrate 130 may be a printed circuit board disposed on a top surface of another semiconductor chip, thereby creating a "semiconductor sandwich" in the cavity of the housing 160.

As will be appreciated by those skilled in the art upon reference hereto, in accordance with the teachings of the present invention, enhanced security and integrity of electronic data that may be stored in the memory of the monolithic semiconductor chip 135 is realized from innovative aspects pertaining to both the physical barriers and detection circuitry that may be tripped by a change in an environmental condition or in an internal operating condition that may be associated with unauthorized accessing of the stored electronic data. These novel aspects of the present invention will be discussed hereinbelow in reference to the rest of the drawings.

Figure 2:
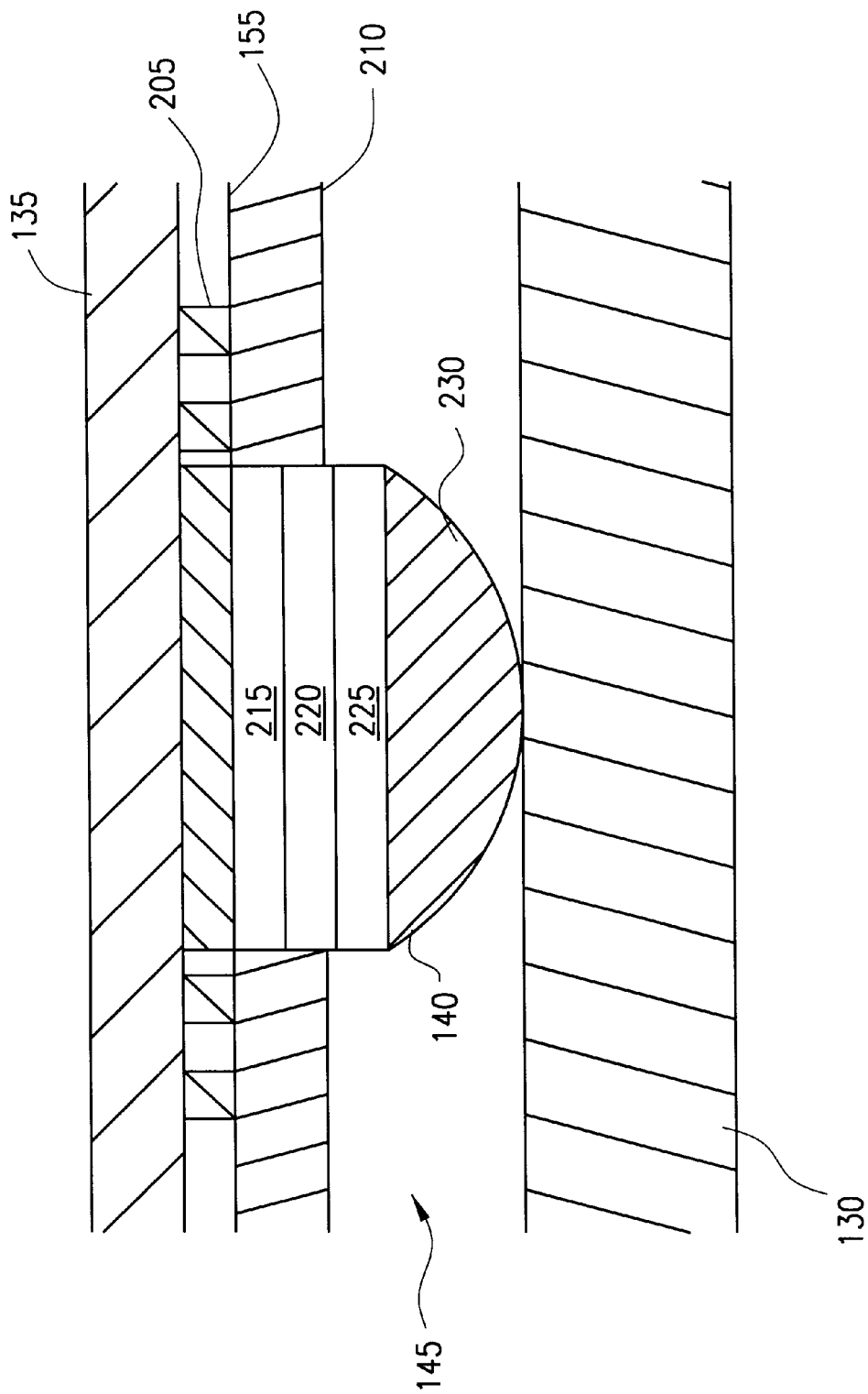
FIG. 2 is an enlarged cross-sectional view of a presently preferred exemplary embodiment of a solder bump.

FIG. 2 depicts an enlarged cross-sectional view of a presently preferred solder bump 140, a plurality of which may be used for affixing the monolithic semiconductor chip 135 to the substrate 130. It is seen that the top passivated side 155 of the monolithic semiconductor chip 135 comprises an interlaced conductive grid 205 of power and ground lines (shown in FIG. 3) that may preferably be interspersed with a di-electric substance such as Silicon Dioxide ($SiO_2$). Although it is shown in this FIG. that the interlaced conductive grid 205 is a single layer, it is contemplated herein that it will be obvious to persons of ordinary skill in the art to fabricate and employ a multi-level interlaced conductive grid to further enhance the security and integrity of stored electronic data according to the teachings of the present invention. In addition, it is envisaged that the interlaced conductive grid 205, which can be either single-level, double-level, or multi-level, may be fabricated according to known processes including but not limited to sputtering of such conventional metals and compositions thereof as Aluminum, Titanium, Tungsten or Titanium-Tungsten.

The interlaced conductive grid 205 is preferably fabricated using minimum design geometries, that is, minimum dimensions for lines and spaces to be used for a specific semiconductor process architecture, so as to specifically minimize at least two things. First, the probability of reaching inner conductive layers of the storage memory for the purpose of reading the logic levels corresponding to the stored data via the various conventional failure analysis techniques such as emission electron microscopy, voltage-contrast or liquid crystal methods, beam-induced current detection et cetera, is minimized because of the physical barrier that is created by the interlaced conductive grid 205. The detector circuits of these conventional techniques are designed to sense such subtle differences as associated with the presence of charge on a programmed memory cell in photon emission, or voltage, or induced current, or visible spectral phase etc. However, the presence of the interlaced conductive grid 205 effectively creates a resistive barrier that will interfere with the detection signal so that reliable reading of the logic levels of the storage memory is impeded.

Furthermore, because of the tight geometries of the interlaced conductive grid 205, the probability of successfully de-layering the monolithic semiconductor chip 135, using conventional chemical etching techniques or focused-ion beam ("FIR") methods is also minimized. It will become obvious to one skilled in the art upon reference hereto that the interlaced conductive grid 205 thereby enhances the security of the data stored in the memory associated with the exemplary electronic data module 100 (shown in FIG. 1).

Continuing to refer to FIG. 2, therein is shown a polyimide layer 210 covering the interlaced conductive grid 205, in accordance with the teachings of the present invention. The exemplary solder bump 140 is preferably a multi-layer structure having a Chromium layer 215 abutting the interlaced conductive grid layer 205, a Chromium-Copper alloy layer 220 deposited on the Chromium layer 215, and a Copper layer 225 deposited on the Chromium-Copper alloy layer 220. The multi-layer structure is then capped with conventional solder material 230 thereby creating the "bump," with which the semiconductor chip 135 is affixed to the substrate 130.

Using a plurality of solder bumps, for example, the exemplary solder bump 140, for adhesion between the semiconductor chip 135 and the substrate 130 achieves at least two purposes. First, because of direct bonding of the semiconductor chip 135 to the substrate 130, precious board area savings are realized by ultimate reduction in packaged chip foot print. For example, in a presently preferred exemplary embodiment of the present invention, a Silicon-to-board ratio of over 40% is achieved. Second, because the monolithic semiconductor chip 135 is facing down, that is, it is "flipped" on the substrate 130, access to conductive layers of the semiconductor chip 135 by conventional de-layering is severely impeded. Further, any detection of backside emission that may be possible in some sophisticated emission microscopy systems is negated by preferably utilizing epitaxial Silicon substrate with suitable modification of dopant characteristics thereof.

Figure 3:
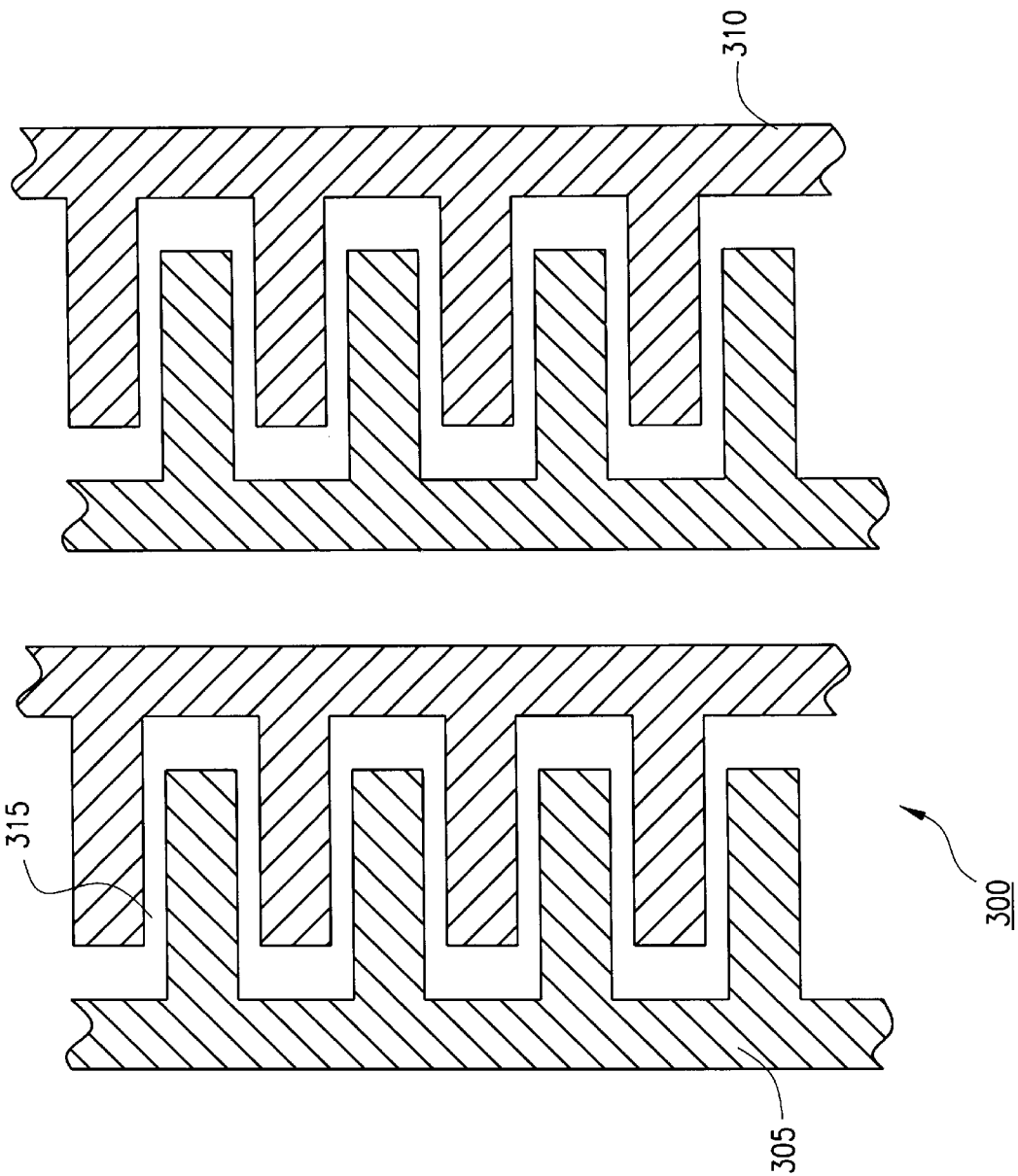
FIG. 3 is a plan view of a portion of an exemplary interlaced conductive grid.

Referring now to FIG. 3, therein is shown a plan view, generally at 300, of a portion of an exemplary interlaced conductive grid (reference numeral 205 in FIG. 2) in accordance with the teachings of the present invention. As discussed hereinabove, although a single layer of the interlaced conductive grid 205 is seen, it will be obvious to skilled persons in the art that the grid 205 may in fact be a multi-layer structure, with a suitable di-electric substance in a space 315 between a power line 305 and a ground 310 to prevent electrical shorts in the chip 135. Further, although the power line 305 and the ground 310 are shown as interweaved comb-like structures, it is obvious that virtually any geometric shape, regular or irregular, for example, a serpentine or helical shape, may be used for fabricating the interlaced conductive grid 205 of the present invention.

Figure 4:
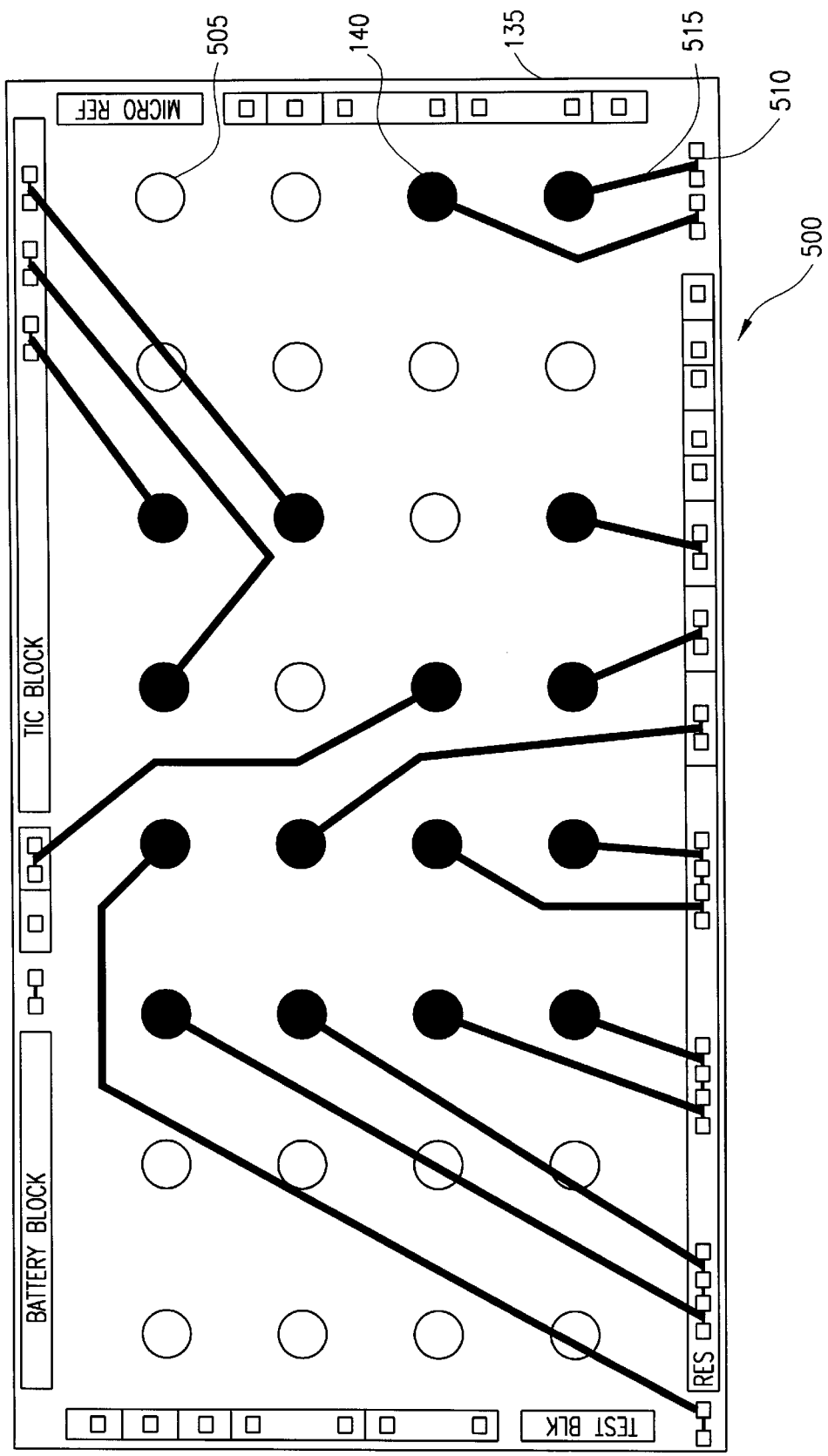
FIG. 4 is a top plan view of an exemplary monolithic semiconductor chip having a plurality of solder bumps.

FIG. 4 depicts a top plan view, generally at 500, of an exemplary monolithic semiconductor chip 135 having a plurality of solder bumps, for example, solder bump 140. The monolithic semiconductor chip 135 preferably has a plurality of bonding pads, for example, bonding pad 510, situated preferably along the outer edges thereof. It is seen that a first sub-plurality of solder bumps, for example, solder bump 140, are electrically connected via connectors, for example, connector 515, to a corresponding first sub-plurality of bonding pads, for example, bonding pad 510. It is also seen that in the exemplary monolithic semiconductor chip 135, a second sub-plurality of solder bumps, for example, solder bump 505, are not electrically connected to any bonding pads thereof. The second sub-plurality of solder bumps are thus preferably provided for adding structural stability between the semiconductor chip 135 and the substrate 130 (shown in FIG. 1).

Figure 5:
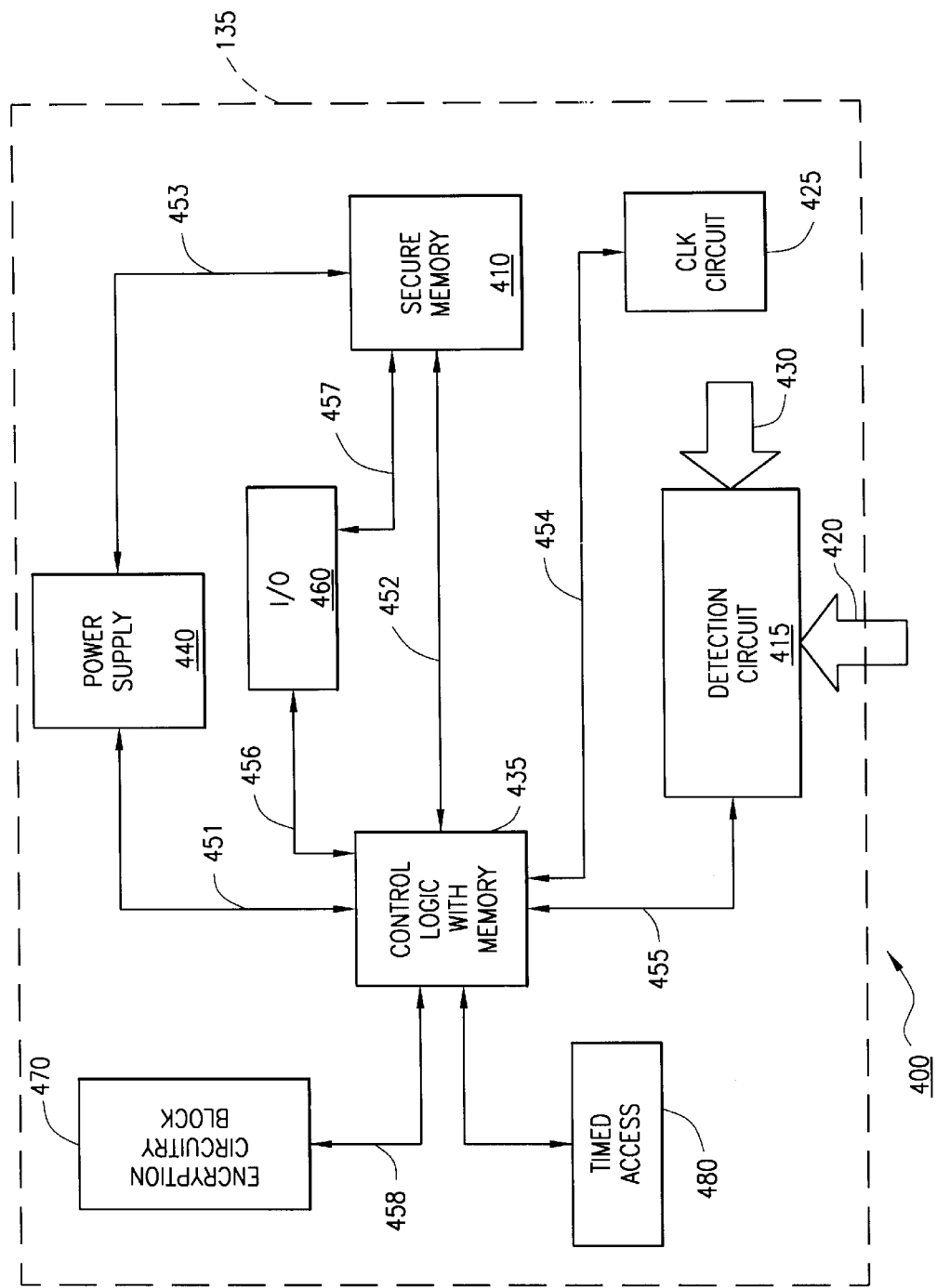
FIG. 5 illustrates a functional block diagram of an exemplary monolithic semiconductor chip.

Referring now to FIG. 5, therein is illustrated a block diagram, generally at 400, of an exemplary embodiment of a monolithic semiconductor chip 135, in accordance with the teachings of the present invention. Functionally, the semiconductor chip 135 comprises a control logic with memory block 435 capable of processing signals generated by a clock circuit block 425, a detection/trip circuit block 415, an encryption circuitry block 470, an input/output block 460, and a secure memory block 410. As is well known in the art, each of these functional blocks of the monolithic semiconductor chip 135 is powered by a power supply block 440.

The secure memory block 410 can preferably be a static random access memory (SRAM) array that may be backed by the power supply 440 so that SRAM is rendered non-volatile. According to the teachings of the present invention, it is the secure memory block 410 that contains valuable electronic data, wherein unauthorized access thereto is hindered by the novel combination of physical barriers, and hardware and software security systems disclosed herein.

The detection/trip circuit block 415 is preferably provided to process either an internal trip signal 430 or an external trip signal 420. The external trip signal 420 may be produced by a variety of transducers that are capable of converting a pre-specified change in an ambient environmental condition into the trip signal 420. It is therefore contemplated herein that it is within the scope of the present invention to provide a detection/trip circuit capable of detecting a change in electromagnetic radiation, pressure, temperature, and ambient chemical composition. Further, it is envisaged that the contemplated electromagnetic radiation changes are detectable over broad ranges of spectra including, for example, visible light, infra-red or ultra-violet waves. In addition, the contemplated chemical composition changes include, for example, gaseous composition changes, moisture content changes, or chemical changes resulting from etching and other de-layering techniques.

Upon detection of the external trip signal 420 by the detection/trip circuit block 415, and upon communicating such detection over a signal communication path 455 to the control logic/memory block 435, the control logic/memory block 435 produces a block erase signal that is transmitted over a signal communication path 452 to the secure memory block 410 in order to erase the electronic data contained therein. The electronic data in the secure memory block 410 may preferably be encrypted by application of an encryption circuitry block 470 in response to a logic signal produced by the control logic/memory block 435. The encryption circuitry block 470 may preferably contain such circuits as a random number generator (not shown), a circular redundancy check (CRC) equation generator (not shown) and a data encoder (not shown).

It will be understood upon reference hereto that upon detecting a change in an ambient condition or attainment of an associated set-point by the detection/trip circuit block 415, it is also possible in another embodiment of the present invention to passively destroy the electronic data contained in the secure memory block 410 by simply cutting off a power line 453 disposed between the power supply 440 and the secure memory block 410.

Continuing to refer to FIG. 5, it may be seen that the detection circuit block 415 is also preferably provided with the capability of processing the internal trip signal 430 that may be produced by a frequency change in an oscillator associated with the clock circuit block 425, or by an elapse of certain time as detected by a timed access block 480, or by a loading on the interlaced power line (reference numeral 305 in FIG. 3) that may be encountered in a reverse-engineering technique, for example, optical beam induced current ("OBIC"), electron beam induced current ("EBIC") or light induced voltage alteration ("LIVA") techniques. Once the internal trip signal 430 is detected by the detection/trip circuit block 415, the control logic/memory block 435 may then apply suitable logic to either actively block erase the secure memory block 410 or passively lose data therein by shutting off power thereto.

As will be appreciated by the persons of ordinary skill in the art, although the detection/trip circuit block 415 is shown as a single functional entity in this FIGURE, it will be obvious upon reference hereto that multiple detection/trip circuits, each circuit being optimized for detecting a pre-determined change in a particular operating condition, may be used in a single embodiment of the present invention.

Figure 6:
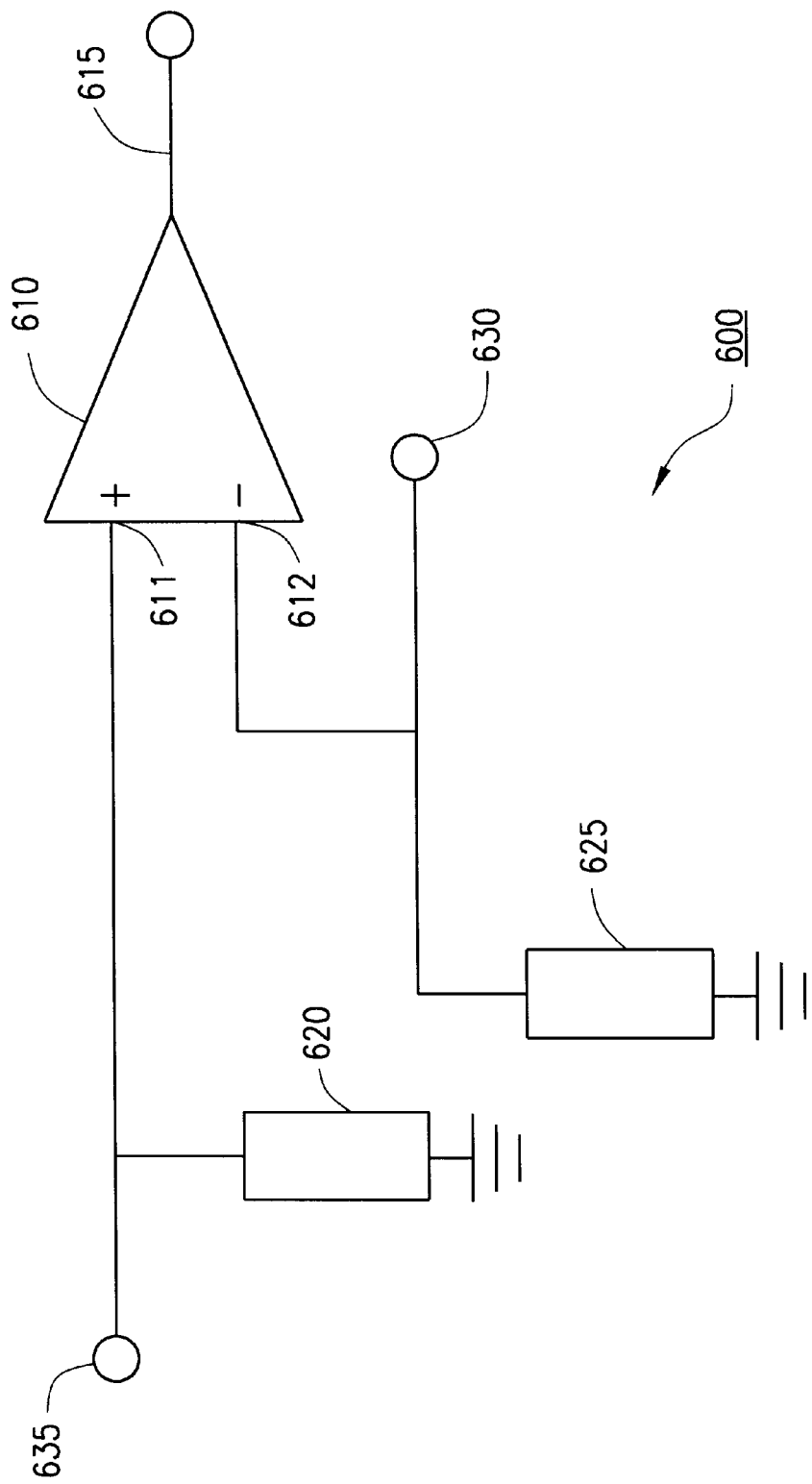
FIG. 6 illustrates a block diagram of a presently preferred exemplary embodiment of a temperature detection circuit used in accordance with the teachings of the present invention.

FIG. 6 illustrates a functional block diagram of a presently preferred exemplary temperature detection/trip circuit, generally designated by reference numeral 600, used in accordance with the teachings of the present invention. It can be seen that a voltage comparator 610 forms the critical functional block of the temperature sense/trip circuit in this embodiment. The comparator 610 has as its inputs a VPTAT ("Voltage Proportional To Absolute Temperature") signal 635 at its positive terminal 611 and a VBGOUT ("Band-Gap Voltage OUTput") signal 630 at its negative terminal 612.

Continuing to refer to FIG. 6, it can be observed that the VBGOUT signal 630, which functions as a reference voltage for the comparator 610, is produced by a band-gap reference block 625. As is known in the art, the band-gap reference block 625 may be implemented using advantageously the voltage-temperature coefficients of bi-polar junction transistors (not shown). Moreover, silicon fuses (not shown) are preferably used for providing a trimming function whereby the magnitude of the VBGOUT signal 630 may be altered depending upon the user's need. In the presently preferred exemplary embodiment, the band-gap reference block 625 is designed so that an untrimmed set-point of −55° C. (or, 218° K) corresponds to a magnitude of 1.25V for the VBGOUT signal 630.

Still continuing to refer to FIG. 6, a temperature sense block 620 produces the VPTAT signal 635. The active devices (not shown) in the block 620 are designed such that a linear relationship between the voltage produced and the temperature of the monolithic semiconductor chip 135 (shown in FIG. 5) is satisfied. In the presently preferred exemplary embodiment, it can be seen that the following equation holds:

VPTAT=1.25(T/218° K.).

In the general operation, if the magnitude of the VPTAT signal 635 is lower than that of the VBGOUT signal 630 (which remains constant over a range of temperature), an output, DESTRUCT signal 615, of the comparator 610 is set to a logic 0. This logic 0 of the DESTRUCT signal 615 may be interpreted by the control logic/memory block 435 (shown in FIG. 5) as a command to erase the contents of the secure memory 410 (shown in FIG. 5). On the other hand, if the magnitude of the VPTAT signal 635 is greater than that of the VBGOUT signal 630, the DESTRUCT signal 615 is set to a logic 1, which is then interpreted by the control logic/memory block 435 such that no erase signal is produced therefrom.

Furthermore, although not shown in this FIG., it can be readily understood by those skilled in the art that the function of the comparator 610 may be coupled in a conventional manner to a timer arrangement such that the voltage comparison may be done only at certain predetermined intervals. In the presently preferred exemplary embodiment, a 1-second timer and a 16 KHZ clock are operably coupled to the comparator 610 wherein the decision to compare the VPTAT signal 635 with the VBGOUT signal 630 is taken once every second. Obviously, many implementational variations can be had, depending upon particular user needs.

Although a preferred embodiment of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims. For example, as a further enhancement to the presently preferred exemplary embodiment, it would be advantageous to structure the secure memory 410 (shown in FIG. 5) into a plurality of segments wherein one or more segments are intentionally left vacant when the data is stored in the rest, and further wherein the data periodically migrates to the unoccupied segments. Clearly, when coupled with the combination of hardware and software barriers disclosed hereinabove, the "fluid" data in the secure memory 410 is even more impervious to unauthorized access. Additionally, the substrate 130 (shown in FIG. 1) can be another semiconductor chip to which the monolithic semiconductor chip 135 may be bonded via the solder bumps 140, thereby integrating security with added functionality such as, for example, increased memory capacity. It is therefore envisaged that these and other modifications and enhancements are within the scope of the present invention as set defined hereinbelow.

What is claimed is:

1. A secured data module apparatus comprising:
   a housing with a cavity formed from a first conductive surface and a second conductive surface with an insulator disposed therebetween in an area where a portion of said first conductive surface and a portion of said second conductive surface overlap such that said insulator is disposed between overlapping side portions of said firs and second conductive surfaces, so as to insulate said first and second conductive surfaces from each other;
   a substrate with a top surface and a bottom surface disposed in said cavity;
   a semiconductor chip comprising a monolithic integrated circuit, said semiconductor chip having a passivated side and a bulk side, wherein said passivated side is affixed to said top surface of said substrate; and
   affixing means for affixing said passivated side of said semiconductor chip to said top surface of said substrate.

2. The secured data module apparatus of claim 1, wherein said housing comprises a metallic container.

3. The secured data module apparatus of claim 1, wherein said affixing means comprises a plurality of solder bumps.

4. The secured data module apparatus of claim 1, wherein said affixing means further comprises:
   a plurality of bonding bumps;
   each of said plurality of bonding bumps further comprising at least one of a chromium layer, a combination layer having chromium and copper, and a copper layer; and
   wherein each of said plurality of bonding bumps is covered with an amount of bonding material.

5. The secured data module apparatus of claim 1, wherein said monolithic integrated circuit comprises at least a memory, said at least a memory at least for storing an encryption key, said encryption key for controlling an operation, said operation being at least one of reading a value from said monolithic integrated circuit and writing a value to said monolithic integrated circuit.

6. The secured data module apparatus of claim 1, wherein said monolithic integrated circuit further comprises at least a register, said at least a register for storing a value, said at least a register being write-protected after storing a value.

7. The secured data module apparatus of claim 1, wherein said monolithic integrated circuit further comprises a trip circuit, said trip circuit being actuatable upon detection of a change in an operating condition, said trip circuit at least for controlling an operation.

8. The secured data module apparatus of claim 7, wherein said change in said operating condition comprises a change in temperature.

9. The secured data module apparatus of claim 7, wherein said change in said operating condition comprises a change in humidity.

10. The secured data module apparatus of claim 7, wherein said change in said operating condition comprises a change light intensity.

11. The secured data module apparatus of claim 7, wherein said change in said operating condition comprises a change in pressure.

12. The secured data module apparatus of claim 7, wherein said change in said operating condition comprises a change in electromagnetic radiation.

13. The secured data module apparatus of claim 7, wherein said change in said operating condition comprises a change in ambient gas composition.

14. The secured data module apparatus of claim 7, wherein said change in said operating condition comprises a change in a frequency associated with a real-time oscillator, said real-time oscillator forming a portion of said monolithic integrated circuit.

15. The secured data module apparatus of claim 1, wherein said monolithic integrated circuit comprises a first metal layer, a second metal layer and a third metal layer, each metal layer being substantially horizontal to the other metal layers.

16. The secured data module apparatus of claim 15, wherein said first metal layer and said second metal layer for providing electrical paths for signals, said third metal layer at least for forming a metallic barrier.

17. The secured data module apparatus of claim 16, wherein said third metal layer comprises a ground line having approximately zero volts and a power line having a voltage level, said ground line and said power line forming an interlaced grid, said interlaced grid at least for detecting probing.

18. The secured data module apparatus of claim 7, wherein said operation comprises erasing a memory, said memory forming a portion of said monolithic integrated circuit, said memory at least for storing data.

19. The secured data module apparatus of claim 14, wherein said operation comprises erasing a memory, said memory forming a portion of said monolithic integrated circuit, said memory at least for storing data.

20. An electronic data carrier system, comprising:
   a housing formed from two concave electrically conductive surfaces and an insulating member disposed therebetween in an area where said concave conductive surfaces overlap such that said insulator is disposed between overlapping side portions of said firs and second conductive surfaces, so as to insulate said first and second conductive surfaces from each other, said housing defining a cavity;
   a substrate disposed in said cavity, said substrate comprising a top surface and a bottom surface;
   a semiconductor chip comprising circuitry for at least storing an encryption key; and
   a plurality of solder bumps for affixing said semiconductor chip to said substrate.

21. The electronic data carrier system of claim 20, wherein each of said solder bumps comprises a multi-layer structure capped with an amount of solder material.

22. The electronic data carrier system of claim 20, wherein each of said solder bumps comprises:
   a first metallic layer;
   a second metallic layer affixed to said first metallic layer; and
   a third metallic layer affixed to said second metallic layer,
   wherein said third metallic layer is at least partially covered with a soldering material.

23. The electronic data carrier system of claim 22, wherein said first metallic layer comprises a chromium layer.

24. The electronic data carrier system of claim 22, wherein said second metallic layer comprises an alloy of chromium and copper.

25. The electronic data carrier system of claim 22, wherein said third metallic layer comprises a copper layer.

26. The electronic data carrier system of claim 20, wherein said semiconductor chip further comprises a detection circuit for detecting a change in a predetermined environmental condition associated with said electronic data module system.

27. The electronic data carrier system of claim 26, wherein said predetermined environmental condition comprises ambient temperature.

* * * * *

UNITED STATES PATENT AND TRADEMARK OFFICE
CERTIFICATE OF CORRECTION

PATENT NO. : 5,998,858
DATED : December 7, 1999
INVENTOR(S) : Little et al.

Page 1 of 1

It is certified that error appears in the above-identified patent and that said Letters Patent is hereby corrected as shown below:

Column 6,
Line 29, replace "FIR" with -- FIB --

Column 9,
Line 63, replace "first conductive" with -- first electrically conductive --
Line 64, replace "second conductive" with -- second electrically conductive --

Column 10,
Line 2, replace "firs" with -- first --.

Column 11,
Line 27, replace "FIR" with -- FIB --.

Signed and Sealed this

Thirtieth Day of October, 2001

*Attest:*

Nicholas P. Godici

NICHOLAS P. GODICI
*Attesting Officer*     *Acting Director of the United States Patent and Trademark Office*